UNITED STATES PATENT OFFICE 2,408,978

WOOD PRESERVATIVES

Bror Olof Häger, Stockholm, Sweden, assignor to Bolidens Gruvaktiebolag, Stockholm, Sweden, a joint-stock company limited of Sweden No Drawing. Application February 3, 1943, Serial No. 474,627. In Sweden January 13, 1941

9 Claims. (Cl. 167—38.5)

Among the substances which, especially lately, have come into use as preservatives for wood and other organic materials are salts of arsenic acid and hydrofluoric acid. Such salts are very effective against wood destroyers. In applying them, efforts have been made to precipitate these salts in the material in a difficultly soluble form in order to prevent their leaching out. Certain methods have given successful results with arsenic acid, while hydrofluoric acid has not been sufficiently fixed, but has been leached out of the wood.

The object of the present invention is the provision of wood preservatives containing both arsenic acid and hydrofluoric acid and in which both the arsenic and the hydrofluoric acids are precipitated in the material in a difficultly soluble form.

The preservatives according to the present invention consist of acid solutions or pastes containing (a) arsenic acid and/or alkali metal arsenate, (b) hydrofluoric acid and/or alkali metal fluoride, and (c) bichromate and/or chromate and/or chromic acid and, in addition, either (1) salts of one or more metals which are capable of forming both difficultly soluble arsenates and difficultly soluble fluorides, or (2) salts of two or more metals of which one or more are capable of forming only difficultly soluble arsenates and the other or others are capable of forming only difficultly soluble fluorides. For this purpose, soluble salts of the metals Ca, Mg, Zn or Al are preferred.

When such a preservative has been introduced into the wood it is supposed that the following reactions take place. Certain substances in the wood will reduce the hexavalent chromium of the chromium compound to a tervalent form, causing precipitation of difficultly soluble chromium arsenates. These reactions reduce the acidity of the preservative; other arsenates and fluorides difficultly soluble in water which are present or produced in the preservative will consequently also be precipitated.

When elaborating the present preservatives it was found that zinc and aluminium salts are the most suitable metal salts for fixing the arsenic acid, and that the presence of both these metal salts in the preservatives will facilitate the dissolution of the salt mixture and improve the durability of the solution. For fixing the hydrofluoric acid calcium and magnesium salts were found most suitable.

The following schedule gives the limits for the composition of suitable preservatives according to the present invention.

| | Parts |
|---|---|
| $Na_2Cr_2O_7.2H_2O$ | 6–15 |
| $Al_2(SO_4)_3.18H_2O$ | 0–25 |
| $ZnSO_4.7H_2O$ | 0–25 |
| $Na_2HAsO_4.7H_2O$ | 0–20 |
| $H_3AsO_4.\tfrac{1}{2}H_2O$ | 5–20 |
| $NaF$ | 1–10 |
| $Ca(NO_3)_2.4H_2O$ or $MgSO_4.7H_2O$ | 5–30 |

The proportions must not be varied arbitrarily within the above limits: The preservatives must contain 1–20 parts of arsenic pentoxide ($As_2O_5$) to 1 part of fluorine (F) and 2–5 parts of arsenic pentoxide to 1 part of chromium (Cr). The preservative must moreover contain sufficient chromium compounds and metal salts for the effective fixation of both the arsenic and the fluorine in form of difficultly soluble compounds and the acidity of the preservative must be sufficient to keep the salts dissolved in water. In practice, impregnating solutions are used in which the arsenic pentoxide and fluorine contents are about 1 per cent by weight of the solution.

The following is given as an example of a preservative composed according to the present invention.

| | Per cent |
|---|---|
| $Na_2Cr_2O_7.2H_2O$ | 14 |
| $Al_2(SO_4)_3.18H_2O$ | 16 |
| $ZnSO_4.7H_2O$ | 7 |
| $Na_2HAsO_4.7H_2O$ | 15 |
| $H_3AsO_4.\tfrac{1}{2}H_2O$ | 18 |
| $NaF$ | 7 |
| $Ca(NO_3)_2.4H_2O$ or $MgSO_4.7H_2O$ | 23 |
| | 100 |

Having thus described my invention I declare that what I claim is:

1. A wood preservative composition characterized in that it contains (a) an arsenic compound selected from the class consisting of arsenic acid and alkali metal arsenates, (b) a fluorine compound selected from the class consisting of hydrofluoric acid and alkali metal fluorides, (c) a chromium compound selected from the class consisting of chromic acid, alkali metal bichromates and alkali metal chromates, and (d) at least one water-soluble salt of at least one of the metals selected from the class consisting of Ca, Mg, Zn and Al; said composition being further characterized in that, upon treatment of wood, both difficultly soluble arsenates and difficultly soluble fluorides are formed in the wood in situ.

2. A wood preservative composition characterized in that it contains (a) an arsenic compound selected from the class consisting of arsenic acid and alkali metal arsenates, (b) a fluorine compound selected from the class consisting of hydrofluoric acid and alkali metal fluorides, (c) a chromium compound selected from the class consisting of chromic acid, alkali metal bichromates and alkali metal chromates, (d) a water-soluble salt of a metal selected from the class consisting of Ca and Mg, and (e) a water-soluble salt of a metal selected from the class consisting of Zn and Al; said composition being further characterized in that, upon treatment of wood, both difficultly soluble arsenates and difficultly soluble fluorides are formed in the wood in situ.

3. A wood preservative characterized by the following composition:

| | Parts |
|---|---|
| $Na_2Cr_2O_7.2H_2O$ | 6–15 |
| $Al_2(SO_4)_3.18H_2O$ | 0–25 |
| $ZnSO_4.7H_2O$ | 0–25 |
| $Na_2HAsO_4.7H_2O$ | 0–20 |
| $H_3AsO_4.\tfrac{1}{2}H_2O$ | 5–20 |
| $NaF$ | 1–10 |
| $Ca(NO_3)_2.4H_2O$ | 5–30 |

4. A wood preservative characterized by having substantially the following composition:

| | Per cent |
|---|---|
| $Na_2Cr_2O_7.2H_2O$ | 14 |
| $Al_2(SO_4)_3.18H_2O$ | 16 |
| $ZnSO_4.7H_2O$ | 7 |
| $Na_2HAsO_4.7H_2O$ | 15 |
| $H_3AsO_4.\tfrac{1}{2}H_2O$ | 18 |
| $NaF$ | 7 |
| $Ca(NO_3)_2.4H_2O$ | 23 |
| | 100 |

5. A wood preservative according to claim 1 characterized by containing 1–20 parts of arsenic pentoxide ($As_2O_5$) to 1 part of fluorine (F).

6. A wood preservative according to claim 1, characterized by containing 2–5 parts of arsenic pentoxide ($As_2O_5$) to 1 part of chromium (Cr).

7. A wood preservative characterized by the following composition:

| | Parts |
|---|---|
| $Na_2Cr_2O_7.2H_2O$ | 6–15 |
| $Al_2(SO_4)_3.18H_2O$ | 0–25 |
| $ZnSO_4.7H_2O$ | 0–25 |
| $Na_2HAsO_4.7H_2O$ | 0–20 |
| $H_3AsO_4.\tfrac{1}{2}H_2O$ | 5–20 |
| $NaF$ | 1–10 |
| $MgSO_4.7H_2O$ | 5–30 |

8. A wood preservative characterized by having substantially the following composition:

| | Per cent |
|---|---|
| $Na_2Cr_2O_7.2H_2O$ | 14 |
| $Al_2(SO_4)_3.18H_2O$ | 16 |
| $ZnSO_4.7H_2O$ | 7 |
| $Na_2HAsO_4.7H_2O$ | 15 |
| $H_3AsO_4.\tfrac{1}{2}H_2O$ | 18 |
| $NaF$ | 7 |
| $MgSO_4.7H_2O$ | 23 |
| | 100 |

9. A wood preservative according to claim 2, characterized by an $As_2O_5/F$ ratio of 1 to 20 parts of the former to 1 part of the latter, and by an $As_2O_5/Cr$ ratio of 2 to 5 parts of the former to 1 part of the latter.

BROR OLOF HÄGER.